US009556390B2

(12) United States Patent
Konda et al.

(10) Patent No.: US 9,556,390 B2
(45) Date of Patent: Jan. 31, 2017

(54) GASIFICATION SYSTEM AND METHOD

(71) Applicant: General Electric Company, Schenectady, NY (US)

(72) Inventors: Srikanth Konda, Bangalore (IN); George Morris Gulko, Houston, TX (US); Ashok Kola, Bangalore (IN); Nithyanandam Mani, Bangalore (IN); Ramesh Mamillapalli, Bangalore (IN); Abhinav Gour, Bangalore (IN)

(73) Assignee: General Electric Company, Schenectady, NY (US)

( * ) Notice: Subject to any disclaimer, the term of this patent is extended or adjusted under 35 U.S.C. 154(b) by 43 days.

(21) Appl. No.: 14/278,517

(22) Filed: May 15, 2014

(65) Prior Publication Data

US 2015/0329358 A1 Nov. 19, 2015

(51) Int. Cl.
*C01B 17/04* (2006.01)
*C10J 3/00* (2006.01)
(Continued)

(52) U.S. Cl.
CPC .. *C10J 3/00* (2013.01); *C01B 3/32* (2013.01); *C10J 3/46* (2013.01); *C10J 3/52* (2013.01); *C01B 2203/025* (2013.01); *C01B 2203/0216* (2013.01); *C01B 2203/0255* (2013.01); *C10J 2200/09* (2013.01); *C10J 2300/0906* (2013.01); *C10J 2300/0913* (2013.01); *C10J 2300/0916* (2013.01); *C10J 2300/0959* (2013.01); *C10J 2300/0976* (2013.01); *C10J 2300/0989* (2013.01); *C10J 2300/169* (2013.01); *C10J 2300/1631* (2013.01); *C10J 2300/1696* (2013.01); *C10J 2300/1807* (2013.01); *C10J 2300/1846* (2013.01);
(Continued)

(58) Field of Classification Search
CPC .... Y02P 70/34; C01B 2203/0255; C01B 3/36; C01B 2203/0415; C01B 2203/049; C01B 3/52; B01D 47/00; B01D 47/06; C10K 1/085; C10K 1/101
See application file for complete search history.

(56) References Cited

U.S. PATENT DOCUMENTS

| 4,099,932 A * | 7/1978 | Child ................. C10G 1/002 208/415 |
| 4,134,740 A | 1/1979 | Marion et al. |
| 6,623,537 B1 * | 9/2003 | Jahnke ................ B01D 47/00 422/232 |

* cited by examiner

*Primary Examiner* — Stanley Silverman
*Assistant Examiner* — Syed Iqbal
(74) *Attorney, Agent, or Firm* — Fletcher Yoder, P.C.

(57) ABSTRACT

A method includes providing a gasifier with a fuel source comprising a heavy oil, a light oil, and recovered soot. The gasifier may gasify the fuel source to generate a syngas and soot. The method also includes recovering the soot in a first separation unit that may receive a portion of the heavy oil and separate the soot from an extraction oil used to recover the soot. The first separation unit generates soot bottoms that include the portion of the heavy oil and the recovered soot. The method also includes flowing a first separation co-fractionate to a second separation unit. The first separation co-fractionate includes the extraction oil and the light oil. The second separation unit may separate the extraction oil and the light oil, and direct the light oil towards the first separation unit. The method further includes mixing the soot bottoms from the first separation unit with the light oil from the second separation unit to generate the fuel source and directing the fuel source to the gasifier for gasification.

20 Claims, 3 Drawing Sheets

(51) Int. Cl.
   *C10J 3/52*   (2006.01)
   *C10J 3/46*   (2006.01)
   *C01B 3/32*   (2006.01)
(52) U.S. Cl.
   CPC ....... *C10J 2300/1853* (2013.01); *Y02E 20/16* (2013.01); *Y02E 20/18* (2013.01); *Y02P 20/145* (2015.11)

GASIFICATION SYSTEM AND METHOD

BACKGROUND

The subject matter disclosed herein relates to gasification systems and, more particularly, to systems for carbon recovery processes.

Fossil fuels, such as solid coal, liquid petroleum, or biomass, may be gasified for use in the production of electricity, chemicals, synthetic fuels, or for a variety of other applications. Gasification involves reacting a carbonaceous fuel and oxygen at a very high temperature to produce synthesis gas, commonly referred to as syngas, which is a fuel containing carbon monoxide and hydrogen. Syngas may combust more efficiently and cleaner than the fuel in its original state before gasification. However, the syngas generated by the gasifier typically contains particulates that may include inorganic contaminants (e.g., fine particles of ash, metals, and ammonia) and unconverted organic matter. The particulates and unconverted carbon are typically removed before use of the syngas. Unfortunately, disposal of the unreacted carbonaceous particulates (e.g., unconverted organic matter, soot) in gasification waste discharge streams decrease the carbon conversion efficiency of gasification systems.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a method is provided. The method includes providing a gasifier with a fuel source comprising a heavy oil, a light oil, and recovered soot. The gasifier may gasify the fuel source to generate a syngas and soot. The method also includes recovering the soot in a first separation unit that may receive a portion of the heavy oil and separate the soot from an extraction oil used to recover the soot. The first separation unit generates soot bottoms that include the portion of the heavy oil and the recovered soot. The method also includes flowing a first separation co-fractionate to a second separation unit. The first separation co-fractionate includes the extraction oil and the light oil. The second separation unit may separate the extraction oil and the light oil, and direct the light oil towards the first separation unit. The method further includes mixing the soot bottoms from the first separation unit with the light oil from the second separation unit to generate the fuel source and directing the fuel source to the gasifier for gasification.

In a second embodiment, a gasification system is provided. The gasification system includes a gasifier that may gasify a fuel source including heavy oil, light oil, and soot to generate a syngas and a carbon recovery unit including a first separation unit that may separate soot from an extraction oil used and provide the gasifier with the fuel source including the soot. A portion of the separated extraction oil includes the light oil. The carbon recovery unit also includes a second separation unit that may receive the separated extraction oil from the first separation unit via a first inlet and separate the extraction oil from the light oil. The separated light oil is directed towards the first separation unit and the second separation unit is fluidly coupled to the first separation unit.

In a third embodiment, a system is provided. The system includes a first separation unit that may provide a fuel source to a gasifier. The first separation unit may receive an oil dispersion including unconverted carbon from a gasification process, a light oil, and an extraction oil. The first separation unit may separate the unconverted carbon from the extraction oil to generate the fuel source and a portion of the separated extraction oil includes a light oil. The system also includes a second separation unit that may separate the extraction oil from the light oil and direct the separated light oil towards the first separation unit.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
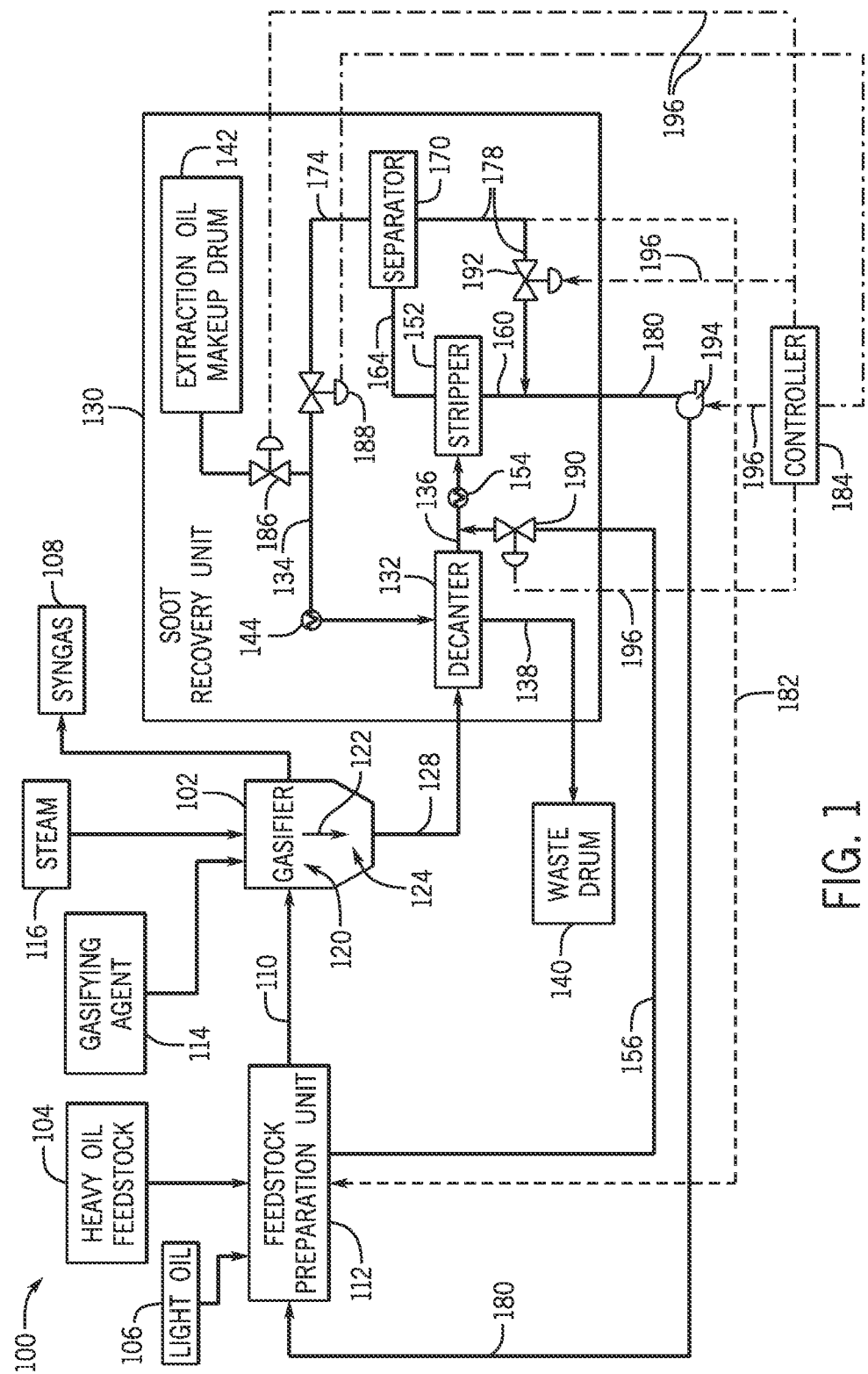
FIG. 1 is a block diagram of an embodiment of a gasification system configured to recover unconverted carbon and separate an extraction oil from a light oil.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a gasification system including a carbon recovery unit designed to recirculate light oil used to facilitate a flow of heavy oil feedstock and soot generated from the gasification of the heavy oil feedstock. In general, the heavy oil is provided from refinery waste products and may include asphalt, tar, or the like. The heavy oil may have a specific gravity (SG) greater than or equal to 1 compared to water at 15° C. For example, in certain embodiments, the heavy oil may have a SG of approximately 1.12 to approximately 1.2 at 15° C. compared to water. During gasification, the heavy oil feedstock is converted into syngas. However, a portion of the heavy oil feedstock may remain unreacted (e.g., soot). To increase the carbon conversion efficiency of the gasification system, the unreacted heavy oil feedstock may be recovered in the carbon recovery unit disposed downstream of a gasifier. The recovered soot may be returned to the gasifier for gasification, and thereby, increase carbon conversion efficiency of the gasification system. Generally, heavy oil feedstock is highly viscous and may be difficult to flow. For example, in certain embodiments, the heavy oil may have a viscosity of between approximately 1250 centistokes to approximately 6000 centistokes at 200° C. In other embodiments, the heavy oil may have a viscosity of between approximately 150 centistokes to approximately 550 centistokes at 250° C. Therefore, the heavy oil feedstock may be mixed with a light oil (e.g., oil having a boiling point range of between approximately 37° C. and 400° C., a specific gravity of 1.0 at 16° C., and a viscosity less than the heavy oil feedstock) prior to gasification. In certain embodiments, the light oil may have a viscosity of between approximately 40 centistokes to approximately 70 centistokes at 99° C. In other embodiments, the light oil may have a viscosity of between approximately 10 centistokes to approximately 30 centistokes at 135° C. Mixing the heavy oil feedstock with the light oil may facilitate a flow of the heavy oil feedstock and recovered soot throughout the gasification system. However, during soot recovery, the heavy oil mixes with the soot (e.g., unreacted carbon) to be recovered, causing an increase in the viscosity of the heavy oil. This increase in viscosity may make it difficult to circulate the recovered soot back to the gasifier for gasification. Accordingly, it may be desirable to provide soot recovery methods that facilitate the flow of the soot to the gasifier by re-mixing the light oil removed during the soot recovery process with the recovered soot. As discussed in detail below, present embodiments include a gasification system configured to recirculate light oil within the soot recovery and recycle unit to facilitate a flow of recovered soot to the gasifier.

FIG. 1 is a schematic diagram of an embodiment of a gasification system 100 designed to recirculate light oil removed during a soot recovery process. As shown in FIG. 1, the gasification system 100 may include a gasifier 102 configured to gasify a heavy oil feedstock 104 to generate a syngas 108. The heavy oil feedstock 104 may include liquid hydrocarbons and mixtures of liquid hydrocarbons and solid carbonaceous fuels. For example, the heavy oil feedstock 104 may include petroleum distillates, gasoline, naphtha, kerosene, crude petroleum, gas oil, residual oil, reduced crude, tar-sand oil, shale oil, coal-derived oil, aromatic hydrocarbons (e.g., benzene, toluene, xylene fractions), coal tar, cycle gas oil, furfural extract, and solid carbonaceous fuel slurries. The solid carbonaceous fuel slurries may include coal, petroleum coke, coal and coke blends, biomass, wood-based materials, agricultural wastes, tars, coke oven gas and asphalt, or other carbon containing materials, and combinations thereof. In addition, the solid carbonaceous fuels may be in the form of a slurry (e.g., a mixture of solid fuel particulate with a liquid, such as water, heavy oil, light oil, etc.) or dispersion and may be resized or reshaped, for example, by chopping, milling, shredding, pulverizing, briquetting, or pelletizing before, during, or after forming the slurry, or dispersion, entering the gasifier 102. Additionally, the heavy oil feedstock 104 may include additives, such as water and/or a light oil 106, to create a heavy oil fuel slurry 110. In certain embodiments, addition of the light oil 106 may facilitate a flow of the heavy oil fuel slurry 110 by decreasing a viscosity of the heavy oil fuel slurry 110. A feedstock preparation unit 112 may receive and process the heavy oil feedstock 104 and the light oil 106 to generate the heavy oil fuel slurry 110. For example, the feedstock preparation unit 112 may include a grinder, a mill, or any similar unit that may resize or reshape the solid carbonaceous fuel, as discussed above. The gasifier 102 may be part of an integrated gasification combined cycle (IGCC) power plant or any other variety of plants that use or produce a syngas. The gasifier 102 may be an updraft or downdraft fixed-bed gasifier, a fluidized-bed gasifier, such as a bubbling fluidized-bed gasifier or a circulating fluidized-bed gasifier, moving bed gasifier, or an entrained flow gasifier.

While in the gasifier 102, the heavy oil feedstock 104 may be mixed with a gasifying agent 114 (e.g., oxygen) and steam 116, or water, within a reactor 120 of the gasifier 102 to produce the syngas 108. In particular, the heavy oil feedstock 104 may be reacted with a limited amount of the gasifying agent 114 (e.g., partial oxidation) at elevated pressures (e.g., from absolute pressures of approximately 2000 kPa to 8500 kPa) and temperatures (e.g., approximately 700° C. to 1600° C.) to partially oxidize the heavy oil feedstock 104 and generate the syngas 108. Due to chemical reactions between the gasifying agent 114, steam 116 (or water), and carbon within the heavy oil feedstock 104, the syngas 108 may include hydrogen, carbon monoxide, carbon dioxides, water, ammonia, hydrogen sulfide, carbonyl sulfide, methane, and traces of heavier hydrocarbons, as well as other less desirable components, such as ash, sulfur, nitrogen, and chloride, present in the carbonaceous fuel. In addition, the syngas 108 may include unconverted carbon or soot (e.g., carbonaceous fuel that did not participate in gasification reactions).

The syngas 108 exiting the reactor 120 may include gasification by-products and/or soot, and this syngas may be referred to as untreated syngas, as indicated by arrow 122. Accordingly, the gasifier 102 may also include a quench chamber 124 downstream of the reactor 120. The quench chamber 124 may cool and separate the untreated syngas 122 from the gasification by-products and the soot. For example, within the reactor 120, the heavy oil feedstock 104 may be heated to undergo a pyrolysis process. According to certain embodiments, temperatures inside the reactor 120 during the pyrolysis process may range from approximately 150° C. to 700° C., depending on the heavy oil feedstock 104 utilized for gasification. The heating of the heavy oil feedstock 104 during the pyrolysis process may generate a solid, e.g., char, and residue gases, e.g., carbon monoxide, water, methane, and hydrogen. The quench chamber 124 of the gasifier 102 may receive the untreated syngas 122 and the gasification by-products, as they leave the reactor 120. In general, the quench chamber 124 may be used to reduce the temperature of the untreated syngas 122, to disengage the gasification by-products and soot from the untreated syngas 122. Similarly, the quench chamber 124 may also quench the gasification by-products and soot. The quench chamber 124 may include a quench fluid (e.g., water) to facilitate cooling of the untreated syngas 122, the gasification by-products, and the soot.

Following separation of the gasification by-products, including any unreacted carbon (e.g., soot) from the untreated syngas 122, a soot slurry 128 (e.g., quench blow down water) is provided to a carbon recovery unit 130 coupled to the gasifier 102. The carbon recovery unit 130 may include a decanter 132 configured to receive the soot slurry 128 during operation of the gasification system 100. In certain embodiments, the decanter 132 may also receive scrubber water from a syngas scrubber used to process (e.g., treat, clean) the untreated syngas 122 downstream of the gasifier 102, such that additional gasification by-products may be removed to form the syngas 108 (e.g., treated syngas). While in the decanter 132, the soot slurry 128 is mixed with an extraction oil 134 that may be used to extract the soot out of the quench fluid, generating a soot oil dispersion 136 and an aqueous discharge stream 138 (e.g., a mixture of quench fluid and gasification by-products). The extraction oil 134 may have a SG of 0.74 at 15° C. and a boiling point range of between approximately 85° C. to approximately 150° C. In certain embodiments, the aqueous discharge stream 138 may be collected in a waste drum 140 or used in other gasification processes (e.g., to generate steam) throughout the gasification system 100. A portion of the aqueous discharge stream 138 from the decanter 132 may be recycled to the quench chamber 124 as quench fluid. To facilitate separation of the soot oil dispersion 136 and the aqueous discharge stream 138 in the decanter 132, the soot oil dispersion 136 and the aqueous discharge stream 138 are generally immiscible and have different densities. This difference in density allows the soot oil dispersion 136 and the aqueous discharge stream 138 to separate by gravity in the decanter 132. For example, in certain embodiments, the extraction oil 134 may have a density that is lower than a density of the aqueous discharge stream 138. As such, the soot oil dispersion 136 may be removed from a top end of the decanter 132 and the aqueous discharge stream 138 may flow out a bottom end of the decanter 132. The decanter 132 may operate at temperatures in the range of between approximately 93° C. to 372° C. or any other suitable temperature depending on the extraction oil 134 utilized. Operational pressures of the decanter 132 are such that vaporization of the extraction oil 134 and soot oil dispersion 136 is blocked or reduced. In certain embodiments, the decanter 132 may operate at pressures of between approximately 1300 kPa to 2500 kPa. In other embodiments, the decanter 132 may operate at the operational pressure of the gasifier 102. The decanter 132 may be a one-stage or multi-stage decanter, such as two-stage, three-stage, or four-stage decanter.

As discussed above, the extraction oil 134 may be utilized to remove the soot (e.g., unconverted carbon) from the soot slurry 128. Suitable examples of the extraction oil 134 include light liquid hydrocarbon fuels having an atmospheric boiling point in the range of between approximately 37° C. to 400° C. and a range of at least 20 to approximately 100 degrees API gravity (e.g., specific gravity of approximately 0.93 to 0.61) such as, but not limited to, butanes, pentanes, hexanes, toluene, benzene, xylene, gasoline, naphtha, gas oil, and mixtures thereof. Other examples of the extraction oil 134 may also include mixtures of liquid organic by-products from an oxo or oxyl process having at least one alcohol, at least one ester, and at least one of an aldehyde, ketone, ether, acid, olefin, saturated hydrocarbon, or water. The extraction oil 134 may also include a combination of light liquid hydrocarbon fuels and mixtures of liquid organic by-products from oxo or oxyl processes, as described above. The extraction oil 134 may be supplied to the decanter 132 by an extraction oil makeup drum 142, recycled from another component of the carbon recovery unit 130, or a combination thereof, as will be described in further detail below. In certain embodiments, the extraction oil 134 may be pre-heated, via heat exchanger 144, prior to entering the decanter 132.

Once separated from the aqueous discharge stream 138, the soot oil dispersion 136 flows into a stripper 152 fluidly coupled to the decanter 132. The stripper 152 may be designed to recover the soot from the extraction oil 134. In addition to recovering the soot, the stripper 152 may circulate the recovered soot to the gasifier 102 and recycle the extraction oil 134 back to the decanter 132. By recovering the soot and recycling the extraction oil 134, the overall efficiency of the gasification system 100 may be improved. For example, soot recovery may increase the carbon conversion efficiency and reduce the carbon footprint of the gasification system 100 by utilizing the recovered soot as a fuel source for gasification. Moreover, recycling the extraction oil 134 may reduce an overall amount of the extraction oil 134 supplied from the extraction oil makeup drum 142 and extraction oil waste (e.g., extraction oil lost outside of the carbon recovery unit 130). Additionally, the gasification system 100 may have fuel flexibility with respect to the kinds of the heavy oil feedstock 104 used for gasification.

Prior to separating the soot from the extraction oil 134, the soot oil dispersion 136 flows through one or more heat exchangers 154 disposed between the decanter 132 and the stripper 152 to flash off any residual water from the soot oil dispersion 136. The soot oil dispersion 136 is also mixed with a heavy and light oil stream 156 from the feedstock preparation unit 112. Combining the soot oil dispersion 136 with the heavy and light oil stream 156 allows the recovered soot to remain in a liquid phase after separation from the extraction oil 134 and facilitate a flow of the recovered soot to the gasifier 102. In certain embodiments, the heavy and light oil stream 156 may have the same composition as the heavy oil fuel slurry 110. In other embodiments, the heavy and light oil stream 156 may have a different composition from the heavy oil fuel slurry 110.

As discussed above, the stripper 152 may separate the soot from the extraction oil 134. Accordingly, the stripper 152 may include a distillation unit (e.g., a fractional distillation unit) that separates the extraction oil 134 from the soot oil dispersion 136. However, in embodiments where the light oil 106 (e.g., from the heavy and light oil stream 156) is mixed with the soot oil dispersion 136, the stripper 152 may also remove the light oil (e.g., the light oil 106). For example, in certain embodiments, the extraction oil 134 and the light oil may have overlapping boiling point ranges. As such, the extraction oil 134 and the light oil may co-fractionate in the stripper 152, resulting in separation of the light oil from the soot oil dispersion 136. This may cause stripper bottoms 160 (e.g., soot and heavy oil mixture) to become viscous and difficult to flow back to the gasifier 102. In addition, as discussed above, the extraction oil 134 may be recycled back to the decanter 132. Therefore, the presence of the light oil in the extraction oil 134 recycle stream may cause undesirable conditions in the decanter 132 and reduce the effectiveness of the extraction oil 134. For example, the light oil may cause an increase in density of the extraction oil 134 compared to extraction oil that is not mixed with the light oil. The increased density may cause the extraction oil 134 to move towards the bottom end of the decanter 132 and make it difficult to separate the soot oil dispersion 136 from the aqueous discharge stream 138. Moreover, the presence of light oil in the extraction oil 134 may contribute to formation of an emulsion in the decanter 132 and cause an increase in an amount of water in the soot oil dispersion 136. This may affect the performance of the decanter 132 and cause an increased production of water discharge from the decanter 132 and may decrease the performance of downstream equipment (e.g., the stripper 152). To mitigate the problems associated with removal of the light oil from the soot oil dispersion 136, a stripper co-fractionate 164 (e.g., a mixture of the extraction oil 134 and light oil) is directed to a separator 170 within the carbon recovery unit 130. Similar to the stripper 152, the separator 170 separates the extraction oil 134 and the light oil.

The separator 170 may include at least one distillation unit (e.g., a fractional distillation unit) designed to separate the extraction oil 134 and the light oil into two streams such that the extraction oil 134, void of light oil, may be recycled to the decanter 132 via extraction recycle stream 174 and the light oil may be recycled back towards the stripper 152 via light oil stream 178. In this way, the stripper bottoms 160 may be mixed with the light oil stream 178 to generate a less viscous soot fuel stream 180. Consequently, the soot fuel stream 180 may flow to the gasifier 102 for gasification. In the illustrated embodiment, the soot fuel stream 180 is directed to the feedstock preparation unit 112 prior to entering the gasifier 102. However, in other embodiments, the soot fuel stream 180 may be supplied directly to the gasifier 102 or to both the gasifier 102 and the feedstock preparation unit 112, or to any component or location therebetween. The soot fuel stream 180 may be supplied continuously or in batch mode. Additionally, in certain embodiments, the separator 170 may also provide the light oil (e.g., through light oil stream 182) to the gasifier 102, the feedstock preparation unit 112, or a combination thereof. The light oil exiting the separator 170 (e.g., light oil streams 178 and/or 182) may also be collected and stored in a light oil drum until further use, for example during batch mode delivery.

The gasification system 100 may also include a controller 184 (e.g., an electronic and/or processor-based controller) to govern operation of the gasification system 100. The controller 184 may independently control operation of the gasification system 100 by electrically communicating with sensors, control valves (e.g., valves 186, 188, 190, and 192), and pumps (e.g., gasifier charge pump 194), or other flow adjusting features throughout the gasification system 100. The controller 184 may include a distributed control system (DCS) or any computer-based workstation that is fully or partially automated. For example, the controller 184 can be any device employing a general purpose or an application-specific processor, both of which may generally include memory circuitry for storing instructions such as gasification parameters (e.g., the gasification conditions of the heavy oil feedstock 104). The processor may include one or more processing devices, and the memory circuitry may include one or more tangible, non-transitory, machine-readable media collectively storing instructions executable by the processor to perform the acts of FIG. 3, as discussed below, and control actions described herein.

In one embodiment, the controller 184 may operate flow control devices (e.g., valves, pumps, etc.) to control amounts and/or flows between the different system components. It should be noted that there may be additional valves throughout the gasification system 100 used to adjust different amounts and/or flows between the system components. In the illustrated embodiment, the controller 184 governs operation of one or more flow control device, such as valves 186 and 188, to allow and/or block a flow of the extraction oil 134 into the decanter 132. For example, during operation of the gasification system 100, the amount of extraction oil 134 from the extraction recycle stream 174 may be less than desirable. Accordingly, the controller 184 may provide instructions to open the valve 186 and allow a flow of extraction oil from the extraction oil makeup drum 138, providing additional extraction oil 134 to the decanter 132. Similarly, the controller 184 may govern operation of valve 190 and 192 to control an amount and/or flow of the heavy and light oil stream 156, for mixing with the soot oil dispersion 136, and the light oil stream 178 to the stripper bottoms 160, respectively. By adjusting the amount and/or flow of the heavy and light oil stream 156 and the light oil steam 178, the desirable viscosity and flow properties of the soot oil dispersion 136 and the soot fuel stream 180, respectively, may be maintained. The controller 184 may also operate the gasifier charge pump 194 that supplies the soot fuel stream 180 to the gasifier 102.

The controller 184 may also govern operation of additional valves to control an amount or adjust a flow of the heavy oil feedstock 104, the gasifying agent 112, the steam 116, the stripper co-fractionate 164, the soot fuel stream 180, or any other fluid within the gasification system 100. For example, during start-up of the gasification system 100, the controller 184 may control a flow of the light oil from the light oil drum to the feedstock preparation unit 112 and/or towards the stripper 152 for mixing with the soot fuel stream 180. In addition, during steady-state operation of the gasification system 100, the controller 184 may control a flow of the light oil (e.g., the light oil stream 178) directly from the separator 170 to the feedstock preparation unit 112 and/or towards the stripper 152 for mixing with the soot bottoms stream 180. In certain embodiments, the flow control device may be part of a weighing mechanism that measures the amount of the heavy oil feedstock 104, including the soot fuel stream 180, before it enters the gasifier 102. Additionally, the controller 184 may also control a reflux rate and operating pressures and temperatures of the stripper 152 and separator 170, depending on the heavy oil feedstock 104, the extraction oil 134, and/or the light oil used for the gasification process. In certain embodiments, the controller 184 may use information provided via input signals to execute instructions or code contained on a machine-readable or computer-readable storage medium and generate one or more output signals 196 to the various flow control devices (e.g., valves 186, 188, 190, and 192 and pump 194) to control a flow of fluids within the gasification system, for example, the extraction oil 134, the heavy and light oil stream 148, and the light oil stream 178.

Figure 2:
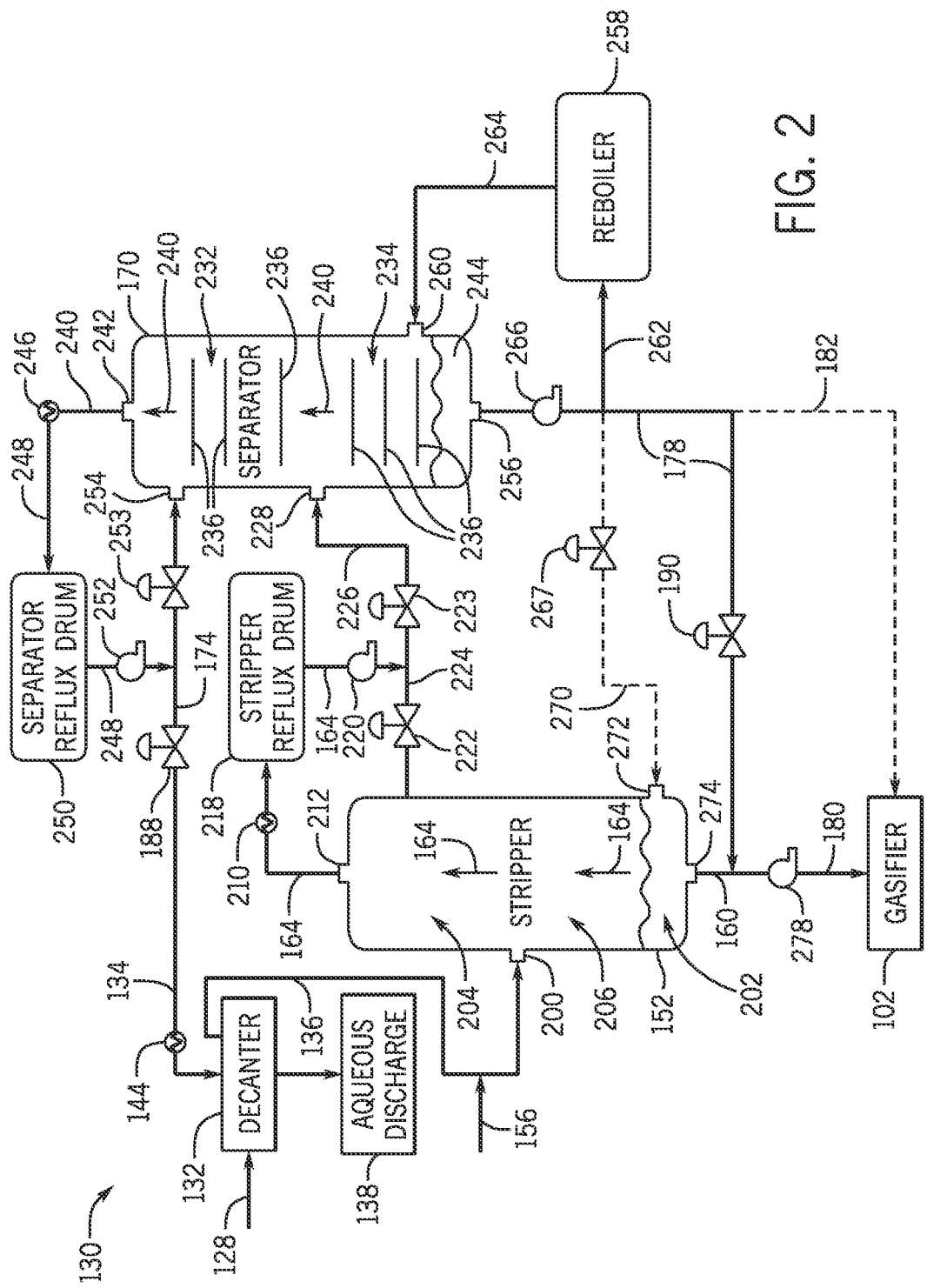
FIG. 2 is a block diagram of an embodiment of a carbon recovery unit that may be used with the gasification system of FIG. 1.

As discussed above, the carbon recovery unit 130 may be configured to recover the soot within the soot slurry 128 (e.g., blow down water) and recycle the extraction oil 134 and the light oil (e.g., the light oil streams 178 and 182) removed from the soot oil dispersion 136 during soot recovery. Turning now to FIG. 2, an embodiment of the carbon recovery unit 130 is illustrated. The carbon recovery unit 130 includes the decanter 132, the stripper 152, and the separator 170. During operation of the gasification system 100, the decanter 132 receives the soot slurry 128 and separates the soot slurry 128 into the aqueous discharge stream 138 and the soot oil dispersion 136. The soot oil dispersion 136 flows into the stripper 152 via a stripper inlet 200. In certain embodiments, the soot oil dispersion 136 may be mixed with the heavy and light oil stream 156 prior to entering the stripper 152. Once in the stripper 152, the extraction oil 134 may be separated from the soot oil dispersion 136 to generate the stripper co-fractionate 164 and recovered soot 202. Accordingly, the stripper 152 includes a stripper top portion 204 and a stripper bottom portion 206 that facilitate separation of the extraction oil 134 from the soot oil dispersion 136. In certain embodiments, the stripper top portion 204 may operate at a temperature of between approximately 100° C. to approximately 175° C. and a pressure of between approximately 200 kPa to approximately 300 kPa and the stripper bottom portion 206 may operate at a temperature of between approximately 200° C. to approximately 300° C. However, the stripper top and bottom portions 204 and 206, respectively, may operate at any other suitable temperature and pressure depending on the heavy oil feedstock 104 and extraction oil 134 utilized in the gasification system 100. The stripper top portion 204 and the stripper bottom portion 206 may each include one or more trays (e.g., bubble-cap trays and/or valve-cap trays) to collect and facilitate separation of volatile components (e.g., the stripper co-fractionate 164) within the soot oil dispersion 136. In other embodiments, at least a portion of the stripper top portion 204, the stripper bottom portion 206, or a combination thereof, may include a packing (e.g., a packed column) to facilitate separation of the volatile components from the soot. The packing may include metal and/or ceramic materials such as, but not limited to, ceramic or metal beads (e.g., Raschig rings), structured sheet metal, or any other suitable packing material. Another embodiment, for contacting high viscosity liquid with vapor in the stripper bottoms portion 206 are shower decks. The shower deck may be generally sloped (e.g., 5, 10 15, 20, 30 40, 45 degrees or more) with respect to a stripper central axis. The shower decks may be poisoned in stripper top portion 204 and the stripper bottom portion 206 to allow a flow by gravity of the high viscosity liquid with the presence of soot. Liquid may exit each shower deck over a notched weir to form a liquid shower that contacts the volatile components (e.g., the stripper co-fractionate 164). The trays, decks, and/or packing materials provide effective and efficient separation of the volatile components from the soot. Accordingly, the recovered soot 202 may be collected in the stripper bottom portion 206. The stripper co-fractionate 164 may exit the stripper 152 through a stripper outlet 212 (e.g., axial port) and may be collected in a stripper reflux drum 218. As should be appreciated, the stripper 152 may include a condenser (e.g., heat exchanger 210) or other overhead components to facilitate condensation and collection of the stripper co-fractionate 164 in the stripper reflux drum 218.

As discussed above, the extraction oil 134 and the light oil mixed with the soot oil dispersion 136 (e.g., from the heavy and light oil stream 156) may have similar and/or overlapping boiling temperature ranges. Therefore, under the operating conditions of the stripper 152, it may be difficult to separate the extraction oil 134 and the light oil from each other. As such, the extraction oil 134 and the light oil may co-fractionate in the stripper 152. Co-fractionation of the extraction oil 134 and the light oil may cause the stripper bottoms 160 to become very viscous and difficult to flow to the gasifier 102. Accordingly, during operation of the carbon recovery 130, a stripper reflux pump 220 may direct a first portion 224 of the stripper co-fractionate 164 back to the stripper 152 for refluxing and a second portion 226 of the stripper co-fractionate 164 to the separator 170 through separator inlet 228. The stripper reflux pump 220 and/or valves 222 and 223 may be adjusted accordingly by the controller 184 to control a flow of the first and second portions 224 and 226, respectively, to maintain the desired reflux rates for effective separation within the stripper 152. The separator 170 is configured to separate the extraction oil 134 from the light oil, as discussed above. While in the illustrated embodiment the stripper 152 and the separator 170 are shown as separate structures, in certain embodiments, the stripper 152 and the separator 170 may be combined into a single distillation unit having outlet ports (e.g., radial outlet ports) distributed at various locations along a length of the distillation unit, each outlet port corresponding to one or more components separated from the soot oil dispersion 136 (e.g., the extraction oil recycle stream 174, and the light oil streams 178 and 182).

Similar to the stripper 152, the separator 170 may include a separator top portion 232 and a separator bottom portion 234. Additionally, the separator top and bottom portions 232 and 234, respectively, may each include one or more separator trays 236. The one or more separator trays 236 may include bubble-cap trays, valve-cap trays, combinations thereof, or any other suitable structure that may achieve the desired degree of separation of the stripper co-fractionate 164. For example, in other embodiments, the separator top portion 232, the separator bottom portion 234, or a combination thereof, may include packing material such as ceramic or metal packing beads (e.g., Raschig rings), structured sheet metal, or other suitable materials. The separator top portion 232 and the separator bottom portion 236 may operate at different temperatures and pressures to increase separation efficiency of the separator 170. For example, in certain embodiments, the separator top portion 232 may operate at a temperature range of between approximately 90° C. and approximately 110° C. and a pressure range of between approximately 200 kPa to approximately 300 kPa. The separator bottom portion 236 may operate at temperatures in the range of between approximately 200° C. to approximately 300° C. However, the separator top and bottom portions 232 and 234, respectively, may operate at other temperature and pressure ranges that are suitable for effective and efficient separation of the stripper co-fractionate 164 into the extraction oil 134 and the light oil streams 178 and 182. Because the extraction oil 134 may be more volatile compared to the light oil under the conditions within the separator 170, extraction oil vapors 240 may move towards a separator outlet 242 and light oil 244 may collect at the separator bottom portion 234.

The extraction oil vapors 242 may pass through one or more heat exchangers 246 (e.g., a condenser) and a condensed extraction oil 248 may be collected in a separator reflux drum 250 coupled to the separator 170. A stripper reflux pump 252 may direct the condensed extraction oil 248 back to the separator 170, via reflux inlet 254, for refluxing or recycle of the condensed extraction oil 248 to the decanter 132 via extraction oil recycle stream 174. The separator reflux pump 252 and/or the valve 188 and valve 253 may be adjusted by the controller 184 to control a flow of the condensed extraction oil 248 to the decanter 132 and/or the separator 170 to maintain extraction oil levels within the decanter 132 and desired reflux rates within the separator 170 for effective separation of the extraction oil 134 from the light oil. During separation of the extraction oil 134 and the light oil 244, the light oil stream 178 exiting the separator 170 (e.g., at a separator outlet 256) may be recirculated to the separator 170 by a reboiler 258 via a reboiler inlet 260, as indicated by arrows 262 and 264.

As noted above, the separator 170 is designed to direct the light oil 244 to the stripper bottoms 160. Therefore, once the extraction oil 134 and the light oil 244 have been separated in the separator 170, the light oil stream 178 may be mixed with the stripper bottoms 160 and/or directed back to the gasifier 102 (e.g., via the light oil gasifier stream 182). In one embodiment, a separator bottoms pump 266 may direct the light oil stream 178 towards the stripper bottom portion 206 via a stripper bottom stream 270. As such, the light oil 244 may enter the stripper 152 through stripper bottom inlet 272 such that the light oil 244 may mix with the recovered soot 202 in the stripper 152. This may facilitate the flow of the recovered soot 202 out of the stripper 152 through stripper outlet 274. In another embodiment, the separator bottoms pump 266 may direct the light oil 244, via light oil stream 178, towards the stripper bottoms 160 exiting the stripper 152 through the stripper outlet 274. In a further embodiment, a first portion of the light oil 244 may be directed towards the stripper bottom portion 206, via stripper bottom stream 270, and a second portion of the light oil 244 may be directed towards the stripper bottoms 160 exiting the stripper 152 (e.g., via the light oil stream 178). The controller 184 may also control operation of the separator bottoms pump 266, the valve 190, and valve 267 to control a flow of the light oil 244 to its respective streams (e.g., streams 178, 182, 262, and 270). By directing the light oil 244 through streams 178 and 270, the stripper bottoms 160 may have desirable flow properties and may be circulated back to the gasifier 102. Additionally, plugging that may be associated with viscous stripper bottoms (e.g., the recovered soot 202 and/or the stripper bottoms 160 without any light oil 244) at the stripper outlet 274 and/or a stripper bottoms pump 278 may be mitigated. In this way, carbon conversion efficiency of the gasification system 100 may be increased and the carbon footprint and operational costs may be decreased, as described above.

Figure 3:
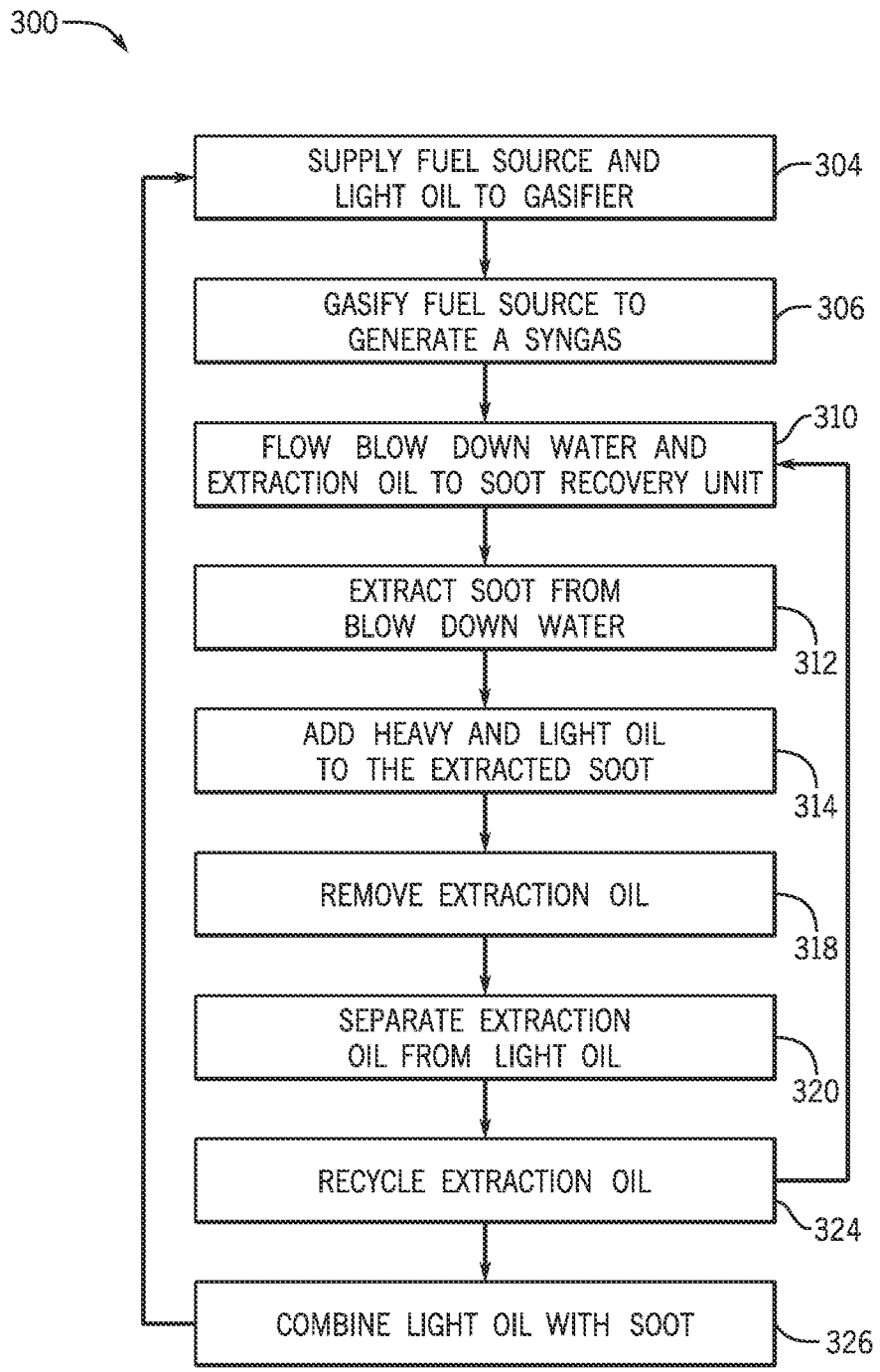
FIG. 3 is a block diagram of an embodiment of a method for recovering unconverted carbon and separating the extraction oil from the light oil using the gasification system of FIG. 1

Present embodiments also include a method that utilizes the gasification system 100 to separate the light oil (e.g., the light oil 244), used to facilitate a flow of the heavy oil feedstock 104 and stripper bottoms 160, from the extraction oil. FIG. 3 illustrates a flow diagram of a method 300 by which a gasification system (e.g., the gasification system 100 described above) may separate a light oil from an extraction oil (e.g., the extraction oil 134) used to extract a soot (e.g., unconverted carbon) from a blow down water stream (e.g., soot slurry 128). The method 300 includes supplying the gasifier 102 with the heavy oil feedstock 104 (block 304), and gasifying the heavy oil feedstock 104 (block 306), as described above with reference to FIG. 1. As discussed above, the heavy oil feedstock 104 may be mixed with a light oil to decrease the viscosity and facilitate the flow of the heavy oil feedstock 104 into the gasifier 102. The method 300 also includes flowing blow down water (e.g., the soot slurry 128) and extraction oil (e.g., the extraction oil 134) to the carbon recovery unit 130 (block 310) and extracting the soot (e.g., the recovered soot 202) from the soot slurry 128 (block 312). The carbon recovery unit 130 may receive the extraction oil 134 from the extraction oil makeup drum 138 or from the separator 170 via the extraction recycle stream 174, as discussed in further detail below.

The method further includes adding the heavy oil and light oil stream 156 to the soot oil dispersion 136 exiting the decanter 132 (block 314). This may facilitate removal of the recovered soot 202 from the stripper 152, as discussed above. The method also includes removing the extraction oil 134 from the soot oil dispersion 136 in the stripper 152 (block 318) and separating the extraction oil 134 from the light oil 244 in the separator 170 (block 320). In this way, the extraction oil 134 may be recycled and recirculated back to the decanter 132 (block 324) with little (e.g., residual) to no amount of the light oil 244. Accordingly, problems associated with the light oil 244 in the decanter 132 during soot extraction may be minimized. Additionally, the separated light oil (e.g., the light oil 244) may be circulated back to the stripper 152 or otherwise mixed with the soot bottoms 160 via streams 178 and 270 to facilitate the flow of the stripper bottoms 160 and heavy oil (e.g., from heavy and light oil stream 156) to the gasifier 102 (block 326).

As described above, certain embodiments of the gasification system 100 may include separating the extraction oil 134 from the light oil 244. As such, the extraction oil 134 may be recycled to the decanter 132 and the amount of extraction oil makeup 138 utilized for extraction of the soot may be decreased. The gasification system 100 may also be configured to supply the recovered soot 202 and/or stripper bottoms 160 with the light oil 244 (e.g., from streams 178 and 270) to the gasifier 102. Therefore, the stripper bottoms 160 may be returned to the gasifier 102 and the gasification efficiency of the gasification system 100 may be increased. In addition, by recycling the extraction oil 134 and recovering the soot (e.g., the soot 202), the amount of waste generated by the gasification system may be decreased, resulting in a decrease in operational costs and the carbon footprint of the gasification system 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
providing a gasifier with a fuel source comprising a heavy oil, a light oil, and recovered soot, wherein the gasifier is configured to gasify the fuel source to generate a syngas and soot;
recovering the soot in a stripper comprising a first stripper inlet configured to receive a portion of the heavy oil and separate the soot from an extraction oil used to recover the soot, wherein the stripper generates soot bottoms comprising the portion of the heavy oil and the recovered soot;
flowing a first separation co-fractionate to a separator, wherein the first separation co-fractionate comprises the extraction oil and the light oil, and wherein the separator is configured to separate the extraction oil and the light oil, and direct the light oil towards the stripper;
mixing the soot bottoms from the stripper with the light oil from the separator to generate the fuel source; and
directing the fuel source to the gasifier for gasification via a first flow path extending between a stripper outlet of the stripper and a gasifier inlet of the gasifier.

2. The method of claim 1, comprising flowing the light oil from the separator into the stripper via a second flow path extending between a separator outlet of the separator and a second stripper inlet of the stripper, wherein the light oil mixes with the soot bottoms in the stripper.

3. The method of claim 1, comprising combining the light oil from the separator with a soot bottoms discharge stream downstream of the stripper via a second flow path extending between a separator outlet of the separator and the first flow path, wherein the second flow path is configured to direct the light oil into the first flow path such that the light oil mixes with the soot bottoms discharge stream downstream of the stripper.

4. The method of claim 1, comprising combining a first portion of the light oil from the separator with the soot bottoms within the stripper via a second flow path extending between a separator outlet of the separator and a second stripper inlet of the stripper and a second portion of the light oil with a soot bottoms discharge stream downstream of the stripper via the first flow path.

5. The method of claim 1, wherein the stripper and the separator are two separate structures.

6. The method of claim 1, wherein the stripper and the separator are disposed within a single structure.

7. The method of claim 1, comprising recycling at least a portion of the extraction oil from the separator to a decanter via a second flow path extending between a separator outlet of the separator and the decanter.

8. The method of claim 1, comprising flowing at least a portion of the light oil from the separator to the gasifier.

9. The method of claim 1, comprising flowing the portion of the heavy oil from a feedstock preparation unit coupled to the gasifier towards the stripper, wherein the portion of the heavy oil mixes with the soot prior to soot recovery in the stripper.

10. A gasification system, comprising:
a gasifier configured to gasify a fuel source comprising heavy oil, light oil, and soot to generate a syngas; and
a carbon recovery unit comprising:
a stripper comprising a first stripper inlet of the stripper configured to receive the soot generated in the gasifier, wherein the stripper is configured to separate soot from an extraction oil and provide the gasifier with the fuel source comprising the soot, wherein a portion of the separated extraction oil comprises the light oil;
a first flow path extending between a stripper outlet of the stripper and a gasifier inlet of the gasifier, wherein the first flow path is configured to direct the fuel source to the gasifier; and
a separator disposed downstream of and fluidly coupled to the stripper, wherein the separator is configured to receive the separated extraction oil from the stripper via a separator inlet of the separator and to separate the extraction oil from the light oil, wherein the separated light oil is directed towards the stripper.

11. The system of claim 10, wherein the stripper comprises a first separation bottom portion configured to directly receive the light oil from the separator via a second stripper inlet of the stripper, wherein the second stripper inlet is fluidly coupled to a separator outlet of the separator via a second flow path extending between the second stripper inlet and the separator outlet.

12. The system of claim 10, comprising a second flow path extending between a separator outlet of the separator and the first flow path, wherein the second flow path is configured to direct the light oil towards a first separation discharge stream comprising the soot, wherein the first separation discharge stream is downstream of the stripper.

13. The system of claim 10, wherein the separator comprises a separator outlet fluidly coupled to a decanter and configured to recycle the extraction oil separated from the light oil to the decanter, wherein the decanter is fluidly coupled to the gasifier.

14. The system of claim 10, wherein the stripper and the separator are two separate structures.

15. The system of claim 10, wherein the stripper and the separator are a single structure.

16. The system of claim 10, comprising a controller having instructions to control operation of the system to provide at least one of a light oil stream from the separator to the stripper, or a discharge stream of the stripper, or a combination thereof, to enable a flow of the second fuel source to the gasifier.

17. A system, comprising:
a stripper configured to provide a fuel source to a gasifier, wherein the stripper comprises a first stripper inlet of the stripper configured to receive an oil dispersion comprising unconverted carbon from a gasification process, a light oil, and an extraction oil and to separate the unconverted carbon from the extraction oil to generate the fuel source, and wherein a portion of the separated extraction oil comprises the light oil;
a separator disposed downstream of and fluidly couple to the stripper, wherein the separator is configured to separate the extraction oil from the light oil and to direct the separated light oil towards the stripper; and
a first flow path extending between a stripper outlet of the stripper and a gasifier inlet of the gasifier, wherein the first flow path is configured to direct the fuel source comprising the unconverted carbon from the stripper and the separated light oil from the separator to the gasifier.

18. The system of claim 17, wherein the stripper comprises a second stripper inlet of the stripper configured to receive at least a portion of the light oil from the separator via a second flow path extending between the second stripper inlet and an outlet of the separator.

19. The system of claim 17, wherein the at least a portion of the light oil from the separator is directed to the first flow path via a second flow path extending between a separator outlet of the separator and the first flow path such that the portion of the light oil mixes with a first separation discharge stream downstream of the stripper, wherein the first separation discharge stream comprises the unconverted carbon.

20. The system of claim 17, wherein the separator comprises a separator outlet of the separator fluidly coupled to a decanter and configured to direct at least a portion of the extraction oil to the decanter and to recycle the portion of the extraction oil to the decanter via a second flow path extending between the decanter and the separator outlet, wherein the decanter is fluidly coupled to the gasifier and stripper.

* * * * *